(12) United States Patent
Lindemann et al.

(10) Patent No.: US 11,016,636 B2
(45) Date of Patent: May 25, 2021

(54) METHODS AND APPARATUSES FOR SELECTING A FUNCTION OF AN INFOTAINMENT SYSTEM OF A TRANSPORTATION VEHICLE

(71) Applicant: VOLKSWAGEN AKTIENGESELLSCHAFT, Wolfsburg (DE)

(72) Inventors: Thorsten Lindemann, Dortmund (DE); Axel Köhnke, Dülmen (DE); Stefan Tubbesing, Bochum (DE); Hans-Udo Pietruschka, Essen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 53 days.

(21) Appl. No.: 16/092,018

(22) PCT Filed: Mar. 28, 2017

(86) PCT No.: PCT/EP2017/057281
§ 371 (c)(1),
(2) Date: Oct. 8, 2018

(87) PCT Pub. No.: WO2017/182236
PCT Pub. Date: Oct. 26, 2017

(65) Prior Publication Data
US 2019/0114039 A1    Apr. 18, 2019

(30) Foreign Application Priority Data
Apr. 18, 2016   (DE) ..................... 10 2016 206 513.0

(51) Int. Cl.
*G06F 17/00* (2019.01)
*G06F 3/0482* (2013.01)
(Continued)

(52) U.S. Cl.
CPC ............ *G06F 3/0482* (2013.01); *B60K 37/06* (2013.01); *G06F 3/04847* (2013.01);
(Continued)

(58) Field of Classification Search
CPC .... G06F 3/04847; G06F 3/167; G06F 3/0482; H04W 4/48; B60K 37/06;
(Continued)

(56) References Cited

U.S. PATENT DOCUMENTS 6,928,614 B1 * 8/2005 Everhart ................ G06Q 10/10
340/539.19
8,682,529 B1    3/2014 Church et al.
(Continued)

FOREIGN PATENT DOCUMENTS

| CN | 101911621 A | 12/2010 |
| CN | 103428258 A | 12/2013 |

(Continued)

OTHER PUBLICATIONS

Search Report for German Patent Application No. 10 2016 206 513.0; dated Apr. 13, 2017.
(Continued)

*Primary Examiner* — Jason T Edwards
(74) *Attorney, Agent, or Firm* — Barnes & Thornburg LLP

(57) ABSTRACT

An infotainment system to which data is transmitted including contact data, such as telephone numbers or addresses, or multimedia data, such as audio or video data. The origin of the transmitted data is a mobile terminal, download from a database, an NFC tag or a QR code. Following reception of the data on the infotainment system, the infotainment system checks whether the transmitted data is associated with one of the functions of the infotainment system, a navigation function, and/or a reproduction function for audio and/or video
(Continued)

data. If the transmitted data is associated with on the functions of the infotainment system, the infotainment system offers those functions with which the data can be associated to a user of the transportation vehicle for use.

19 Claims, 1 Drawing Sheet

(51) Int. Cl.
  *B60K 37/06* (2006.01)
  *H04M 1/60* (2006.01)
  *H04W 4/48* (2018.01)
  *G06F 3/0484* (2013.01)
  *G06F 3/16* (2006.01)

(52) U.S. Cl.
  CPC .......... *G06F 3/167* (2013.01); *H04M 1/6091* (2013.01); *H04W 4/48* (2018.02); *B60K 2370/164* (2019.05); *B60K 2370/589* (2019.05); *B60K 2370/5899* (2019.05); *B60K 2370/5911* (2019.05)

(58) Field of Classification Search
  CPC ...... B60K 2370/589; B60K 2370/5899; B60K 2370/5911; B60K 2370/164; H04M 1/6091
  USPC ........................................................ 715/727
  See application file for complete search history.

(56) References Cited

U.S. PATENT DOCUMENTS

| | | | |
|---|---|---|---|
| 8,930,466 B2 | 1/2015 | Kramarz-Von-Kohout et al. | |
| 9,641,989 B1* | 5/2017 | Dietrich | H04W 4/12 |
| 2013/0117021 A1* | 5/2013 | James | G01C 21/362 |
| | | | 704/235 |
| 2014/0005885 A1* | 1/2014 | Gopinath | G01C 21/362 |
| | | | 701/36 |
| 2014/0303839 A1* | 10/2014 | Filev | G06F 3/0481 |
| | | | 701/36 |
| 2014/0378063 A1 | 12/2014 | Nathwani et al. | |
| 2015/0012826 A1 | 1/2015 | Tengstrand et al. | |
| 2015/0206526 A1 | 7/2015 | Schild | |
| 2015/0266377 A1* | 9/2015 | Hampiholi | H04M 1/72552 |
| | | | 455/466 |
| 2016/0189444 A1* | 6/2016 | Madhok | G07C 5/02 |
| | | | 701/36 |

FOREIGN PATENT DOCUMENTS

| | | |
|---|---|---|
| CN | 103914990 A | 7/2014 |
| CN | 104508718 A | 4/2015 |
| DE | 102009056203 A1 | 6/2011 |
| DE | 102011079875 A1 | 2/2012 |
| DE | 102012009430 A1 | 11/2013 |
| DE | 102014200560 A1 | 7/2015 |
| JP | 2011187058 A | 9/2011 |
| WO | 2009101163 A2 | 8/2009 |

OTHER PUBLICATIONS

Search Report for International Patent Application No. PCT/EP2017/057281; dated Aug. 14, 2017.

Office Action for Korean Patent Application No. 10-2018-7026862; dated Sep. 6, 2019.

Office Action for Chinese Patent Application No. 201780024322.1; dated Feb. 3, 2021.

* cited by examiner

METHODS AND APPARATUSES FOR SELECTING A FUNCTION OF AN INFOTAINMENT SYSTEM OF A TRANSPORTATION VEHICLE

PRIORITY CLAIM

This patent application is a U.S. National Phase of International Patent Application No. PCT/EP2017/057281, filed 28 Mar. 2017, which claims priority to German Patent Application No. 10 2016 206 513.0, filed 18 Apr. 2016, the disclosures of which are incorporated herein by reference in their entireties.

SUMMARY

Illustrative embodiments relate to methods and apparatuses for selecting a function of an infotainment system of a transportation vehicle.

BRIEF DESCRIPTION OF THE DRAWINGS

Disclosed embodiments are described in detail below on the basis of the drawings, but generally without being restricted on the whole to the example embodiments. In the drawings.

DETAILED DESCRIPTION

Figure 1:
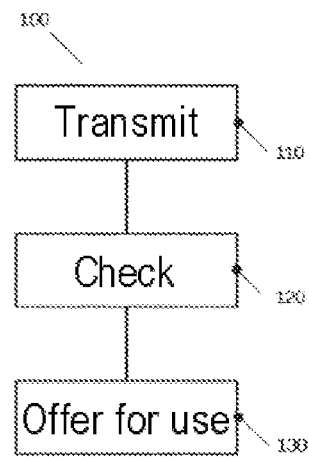
FIG. 1 shows a flow diagram of an exemplary embodiment of a method for selecting a function of an infotainment system of a transportation vehicle.

In recent years, the expansion of information technology systems in transportation vehicles has undergone rapid development and its commercial potential has increased substantially. This trend is expected to continue in the period ahead. Nowadays, transportation vehicles are frequently equipped with infotainment systems which offer the user of the transportation vehicle information technology and communication technology solutions for use, such as, for example, navigation, telephony and driver assistance functions, but also entertainment electronics solutions, such as radio reception and playback of audio data.

The development to be observed is associated above all with the increasing, almost ubiquitous proliferation of Smartphones, tablet personal computers (tablet PCs), laptops and other mobile electronic terminal devices. In addition, printed media, such as, for example, business cards or posters, are provided with quick-response codes (QR codes), radio-frequency identification tags (RFID tags) or near-field communication tags (NFC tags) to effect a networking with electronic terminal devices.

Since a user of a transportation vehicle often has a mobile electronic terminal device, in particular, a Smartphone or tablet PC, which he frequently uses in everyday life outside the transportation vehicle also, or has printed media which are provided, for example, with a QR code or an NFC tag, he transmits data in the transportation vehicle in many situations from the mobile terminal device, the NFC tag or the QR code to the infotainment system, the data being stored there. The user can then use the transmitted data with the infotainment system.

However, the use of the data on the infotainment system often turns out to be laborious or complicated for the user, particularly during the journey, so that he is often unable to make full or partial use of infotainment functions linked to the data. Moreover, in many cases, functions of an infotainment system which further process data transmitted by the user are not efficiently implemented for the infotainment system and for the user, i.e., they unnecessarily occupy memory space and require a multiplicity of interactions from the user.

A need therefore exists to improve the existing methods and apparatuses for the use of functions of infotainment systems in transportation vehicles. This need is taken into account by the methods and apparatuses according to the independent claims.

Example embodiments can achieve this as follows: Data, for example, contact data, such as telephone numbers or addresses, or multimedia data, such as audio or video data, are transmitted to an infotainment system. The data may have been transmitted to the infotainment system, for example, from a mobile terminal device, for example, a Smartphone or a tablet PC, for example, by NFC or BLUETOOTH®. The infotainment system may also have downloaded the data, for example, from the Internet, for example, via a mobile radiocommunication link, or may have read them from an NFC tag or a QR code. Following reception of the data on the infotainment system, the latter checks whether the transmitted data can be assigned to one of its functions, such as, for example, a telephony function, a navigation function or a playback function for audio or video data. If so, the infotainment system offers those functions to which the data can be assigned via an output interface, for example, on a display integrated into the infotainment system, to a user of the transportation vehicle for use.

It can be beneficial here, for example, that the selection and therefore the use of the functions of the infotainment system can become more efficient for the user. Fewer operations on the infotainment system, for example, may thus be required for the user, since the possible functions can be offered to the user directly for use.

According to the disclosure, the infotainment system comprises at least two operating modes, wherein each operating mode has at least one function which can be offered to the user for use. If data are transmitted to the infotainment system while the infotainment system is in one of these specific operating modes or after a specific operating mode has been predefined for the infotainment system by the manufacturer or by the user of the transportation vehicle as higher-priority, the infotainment system can offer those functions to the user which the active or the predefined operating mode has. Alternatively, the infotainment system can offer exclusively those functions which the active or predefined operating mode has to the user for use.

In some example embodiments, information can furthermore be extracted from the transmitted data. The extracted information can then be linked as parameters to the functions which are to be offered for use. In other words, possible example embodiments of the method offer the user not only functions for use to which the transmitted data can be assigned, but also functions which can additionally further process the data transmitted to the infotainment system. This further processing of the data can be displayed to the user together with the functions.

Along with a further reduction in the number of operations on the infotainment system, this can offer the benefit that the infotainment system can store or can temporarily store only the extracted information which is relevant to the performance of the functions, or can entirely avoid permanent storage, above all storage in a non-volatile memory, for example, in an electronic storage medium, such as an Electrically Erasable Programmable Read-Only Memory (EEPROM for short), flash EEPROM, or solid-state drives (SSD for short), in a magnetic storage medium, in particular, hard disk drives (HDD for short), or in a Read-Only Memory (ROM for short), such as compact discs (CDs) or Digital Versatile Disks (DVDs for short). It can be beneficial here that memory space required for the data can be reduced and the memory can be subjected to fewer read, write and erase operations, so that the service life of the storage medium can be prolonged. This is important in the transportation vehicle sector, since electronic storage media are frequently used here which are suitable for use in the transportation vehicle due to an absence of moving parts, but can age quickly, above all due to write and erase operations. Maintenance intervals can be lengthened through a more economical use of the memory.

In some example embodiments, the functions which are to be offered to the user for use can be presented on a display device of the infotainment system, for example, on a liquid crystal display (LCD for short) as texts and/or visual representations assigned to the functions. Alternatively or additionally, they can be offered to the user for use through the output of speech assigned to them, for example, through the announcement of names assigned to them and their parameters, via a speech generation device, for example, via audio amplifiers and loudspeakers of the infotainment system.

The benefit of an announcement of the functions may, for example, be that a user of the transportation vehicle, above all during the journey, can focus his attention primarily on the road and the traffic. If the infotainment system comprises, for example, a confirmation key on the steering wheel of the transportation vehicle, the user can perform the function efficiently by actuating this confirmation key, for example, while it is being announced or shortly after it has been announced.

The priority offering of functions may be implemented in some example embodiments in such a way that the functions which are to be offered with priority are shown first to the user, for example, within a list presented on a display of the infotainment system, and/or are already marked in this list, so that the user can perform a priority offered function simply by a confirmation, for example, by pressing a confirmation key on an input device assigned to the infotainment system. Functions which are not offered with priority are listed at later positions in the list, after or below the functions which are to be offered with priority, and/or are unmarked.

If functions are offered to the user via an announcement by a speech generation device, the offering with priority can be carried out in such a way that functions which are to be offered with priority are announced temporally first. Functions which are to be offered for use, but are not priority, can be announced temporally after the functions which are to be offered with priority.

The benefit of a priority offering of functions can be that the number of interactions between the user and the infotainment system can be reduced. As a result, for example, the process of selecting functions of the infotainment system and providing them with parameters can be speeded up and the infotainment system can perform the functions temporally earlier and therefore beneficial for the user.

If, for example, the user leaves a parking lot with the transportation vehicle and requires navigation to a journey destination at an exit from the parking lot, it can be beneficial if the selection and setting of the navigation function, i.e., the transfer of an address as a journey destination into the navigation, can take place quickly, ideally while the user is still heading toward the exit in the transportation vehicle so that, on reaching the exit, the destination guidance can already start and the user or driver can obtain information on the direction of travel at the exit. This can enable an efficient use of the transportation vehicle.

An exclusive offering of functions which the active or predefined operating mode has when the data are transmitted can offer the benefit that the user is not confused by a multiplicity of possible functions and can therefore make a fast and reliable selection of the functions.

In some example embodiments, the infotainment system can be configured to offer functions frequently used by the user with priority or exclusively to the user for use. This can be implemented, for example, in such a way that the infotainment system can store a number of performances of its individual functions by the user and can thus recognize functions with a number of performances which is high compared with that of other functions as being functions that are frequently used by the user.

In some example embodiments, the infotainment system can additionally be designed in such a way that the user can configure whether functions predefined by him or by the manufacturer and/or frequently used functions are with priority or exclusively offered by the infotainment system for use.

In at least some example embodiments, insofar as the transmitted data comprise contact data, such as, for example, an address and/or a telephone number, that a navigation to the address transmitted in the contact data or a telephone call to a connection assigned to the telephone number is offered by the infotainment system to the user as a function for use. It can additionally be beneficial here that an input of the address or the telephone number which is laborious for the user is no longer required and the user can therefore use the infotainment system more efficiently through fewer interactions. In addition, possibilities for incorrect manual inputs of the address or the telephone number can thus be reduced.

In a similar manner, a disclosed embodiment provides a playback of multimedia data, in particular, audio and video data, as a function which is to be offered to the user for use, insofar as the transmitted data comprise multimedia data. The infotainment system often has high-quality, powerful electronic entertainment equipment which can be used efficiently in the manner described if data are transmitted, for example, from a mobile terminal device to the infotainment system or are retrieved by the infotainment system, for example, via a mobile radiocommunication link, from the Internet or from a database, in particular, from a data cloud.

Further disclosed embodiments provide a method for selecting a function of an infotainment system of a transportation vehicle. Data are transmitted to the infotainment system. The infotainment system checks whether the transmitted data can be assigned to one of its functions. If so, the infotainment performs this function. One benefit here can be that a user of the infotainment system does not need to perform any further operations on the infotainment system once the data have been transmitted.

The infotainment system can extract information from the transmitted data and can link the information as parameters to the function which is to be performed. If, for example, data containing a telephone number are transmitted to the infotainment system, the infotainment system can make a telephone call to a connection assigned to the telephone number.

If the transmitted data can be assigned to a plurality of functions, the infotainment system can be configured in such a way that it can perform all possible functions or only one or more predefined functions exclusively. If data transmitted to the infotainment system contain, for example, an address and a telephone number, and if the infotainment system is configured, for example, in such a way that it is intended exclusively to perform navigation functions following the transmission of data, the infotainment system can carry out a destination guidance to the address without further operations. A telephone call is not made by the infotainment system without further operations.

Further disclosed embodiments indicate an infotainment system for a transportation vehicle. The infotainment system comprises a communication interface via which data can be received, for example, from a mobile terminal device or from the Internet, from an NFC tag or from a QR code. A wireless interface is desirable, for example, a mobile radio-communication interface, a BLUETOOTH® interface, an interface for Wireless Local Networks (WLANs), a near-field communication interface or an optical interface, such as, for example, a video or photo camera or a scanner, to be able, for example, to read in a QR code. In some example embodiments, the communication interface can alternatively or additionally be a line-connected interface, for example, a Universal Serial Bus (USB for short) or a line-connected network connection, such as an Ethernet connection.

The infotainment system additionally comprises an analysis device by which it can be checked whether the data transmitted to the infotainment system can be assigned to functions of the infotainment system. This analysis device may, for example, be a Central Processing Unit (CPU) which can be equipped with software for the check to be carried out. Further implementations of the analysis device may be Application-Specific Integrated Circuits (ASIC for short) and/or Field-Programmable Gate Arrays (FPGA for short) on which the described software is installed or in which the check to be carried out is implemented in hardware.

The infotainment system from possible embodiments furthermore comprises an output interface which is configured to offer those functions to which the data can be assigned to a user for use. As already described, this output interface may, for example, be a display device for text and other visual representation forms, such as, in particular, an LCD and/or a speech and/or sound generation device, such as, for example, an audio amplifier and loudspeaker.

Disclosed embodiments relate to a transportation vehicle which is equipped with an infotainment system.

Different example embodiments will now be explained in more detail with reference to the attached drawings in which a number of example embodiments are shown.

Although example embodiments can be modified and altered in different ways, example embodiments are shown in the figures as examples and are described in detail herein. However, it should be made clear that it is not intended to restrict example embodiments to the respectively disclosed forms, but rather that example embodiments are intended to encompass all functional and/or structural modifications, equivalents and alternatives which fall within the scope of the disclosure.

It should be noted that an element which is designated as being "connected" or "coupled" to another element can be directly connected or coupled to the other element, or intermediate elements may be present. Conversely, if an element is designated as being "directly connected" or "directly coupled" to another element, no intermediate elements are present. Other terms which are used to describe the relationship between elements should be interpreted in a similar manner (e.g., "between" as opposed to "directly between", "adjacent" as opposed to "directly adjacent", etc.).

The terminology that is used herein serves only to describe specific example embodiments and is not intended to restrict the example embodiments. As used herein, the singular forms "a", "one", "the" are also intended to include the plural forms, unless the context clearly indicates otherwise. It should furthermore be made clear that expressions such as, e.g., "contains", "containing", "has", "comprises", "comprising" and/or "having", as used herein, indicate the presence of specified features, whole numbers, operations, work processes, elements and/or components, but do not exclude the presence or the addition of one or more features, whole numbers, operations, work processes, elements, components and/or groups thereof.

Figure 2:
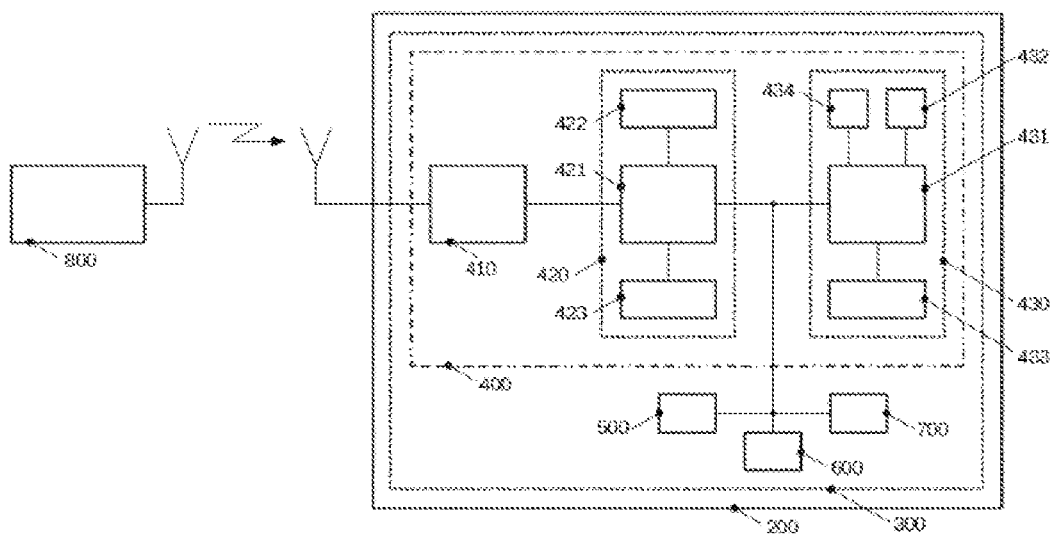
FIG. 2 shows a block diagram of an exemplary embodiment of an apparatus in a transportation vehicle for selecting a function of an infotainment system.

FIG. 1 illustrates a method 100 and FIG. 2 an apparatus 400 for selecting a function of an infotainment system 300 of a transportation vehicle 200.

The method 100 begins with a transmission 110 of data to the infotainment system 300. The data can be transmitted, for example, from a mobile terminal device 800. The mobile terminal device 800 may, for example, be a Smartphone, a laptop or tablet PC. However, it should be noted that, beyond this example embodiment shown here, data can also be transmitted, for example, via an Internet connection or by reading an NFC tag or a QR code. To receive the transmitted data, the apparatus 400 comprises a communication interface 410, for example, for WLAN, BLUETOOTH® or NFC. If BLUETOOTH® is used for the transmission 110 of the data, the mobile terminal device 800 can use, for example, an Object Exchange Protocol (OBEX protocol for short).

Following the transmission 110 of the data, the data can be forwarded to a control unit 421 of the analysis unit 420 for checking 120. The control unit 421 may, for example, be a CPU with software or firmware with which it can be checked whether the transmitted data can be assigned to functions of the infotainment system 300. In the example embodiment presented here, the infotainment system 300 comprises a telephone 500 for a telephony function, a navigation system 600 for a navigation function, and an audio system 700 for the use of audio functions, for example, the playback of audio data or radio broadcasts.

If the data are, for example, contact data, in particular, an address and/or a telephone number, they are often transmitted as a digital business card 110. Digital business cards are often presented and transmitted 110 in a vCard file format (short for Versit card, named after the file format creator Versit), also referred to as the VCF file format. Other possible file formats for contact data or digital business cards are the comma-separated values file format (CSV file format) and the text file format (TXT format for short).

Contact data can also be contained in digital calendar files, for example, in the iCalendar file format.

Data, in particular, telephone numbers, addresses or geographical coordinates, can also be transmitted 110 by a Uniform Resource Identifier (URI for short) and/or by a Uniform Resource Locator (URL for short) from the mobile terminal device 800 to the infotainment system 300. URIs and URLs are frequently used as a data format for transmitting 110 data via an NFC link from mobile terminal devices 800 or NFC tags.

In addition, a URL can be assigned to an Internet page, wherein the Internet page may comprise, for example, a map with a destination marked therein and/or a telephone number so that information relating to the marked destination or the telephone number may be contained in the URL. The URL can thus be used to transmit 110 the marked destination or the telephone number to the infotainment system 300.

The control unit 421 can now refer to the file format or data format and/or to the file content or the data content to check 120 whether the transmitted data can be assigned to functions of the infotainment system 300. For example, vCard files can contain a field with the qualifier "TEL" for a telephone number and/or a field with the qualifier "ADR" for an address, a URI or a URL, for example, a qualifier "geo" followed by a geographical location which can be read out by the control unit 421. Qualifiers of this type contained in URIs or in URLs are referred to jointly with the geographical locations described by them as geotags or webtags.

If, for example, data transmitted as a digital business card contain a telephone number and an address, they are read out by the control unit 421 and a telephony function and a navigation function are offered 130 to a user for use. In some example embodiments, a call to a connection assigned to the telephone number via the telephone 500 and a navigation to the address by a navigation system 600 are offered 130. The telephone number and the address can thus be extracted by the control unit 421 from the transmitted 110 data and can be transferred as parameters to the functions which are to be offered for use. The telephone 500 and/or the navigation system 600 can either be a telephone or navigation system integrated into the infotainment system 300 or external devices connectable to the infotainment system.

To offer 130 the functions to the user for use, the control unit 421 can transmit signals assigned to the functions to a monitoring module 431 of an output interface 430 of the apparatus 400. The monitoring module 431, for example, a graphics card, a graphics processor a video display controller, a sound card or a sound processor, can then output texts, graphical representations and/or speech assigned to the functions and, where appropriate, to their parameters, on a display device 432 comprised by the output interface 430, for example, an LCD, or via a speech generation device 433 comprised by it, for example, audio amplifiers and loudspeakers. Then, via an input device 434, in this example embodiment connected to the monitoring module 431, for example, a keypad, a rotary switch and/or a confirmation key, the user can then select, i.e., mark, the text assigned to a function and, where appropriate, to its parameters, or a graphical representation assigned to it, and can confirm the selection by pressing a key. Alternatively or additionally, in the case of a speech output, the user can perform a selection of a function by pressing a key, for example, by using a confirmation key while a function is being announced, or by an input of a digit assigned to the function.

Following the selection of a function by the user, the input device 434 or the monitoring module 431 can generate a signal corresponding to the selection and can transmit it to the control unit 421. The control unit 421 can then initiate a performance of the function by the infotainment system 300, for example, by the telephone 500, the navigation system 600 or the audio system 700.

The analysis unit 420 can additionally comprise a volatile memory 422, for example, a Random Access Memory (RAM for short) and a non-volatile memory 423, for example, an SSD. A RAM 422 and an SSD 423 are assumed by way of example below. Since the control unit 421 checks during the data analysis whether the data can be assigned to functions of the infotainment system 300, it also checks which texts of the transmitted data can be used and how they can be used by the infotainment system 300.

If, for example, a transmitted digital business card contains not only a telephone number and an address, but also a photo and/or a logo which normally require(s) substantially more memory space than the telephone number and the address, the control unit 421 can be configured, for example, by a default setting of the user or the manufacturer, in such a way that, for example, it stores only the telephone number, the address and a name assigned to them from the digital business card on the SSD 423 and can thus make sparing use of the SSD 423 and minimize the storage requirement by discarding the photo or the logo. Additionally or alternatively, the control unit 421 can be configured to temporarily store, for example, the transmitted digital business card in the RAM 422 only and again discard it following the offering and performance of a function, for example, a telephone call, so that no write operations need to be carried out on the SSD 423.

The control unit 421 can furthermore be configured to check an active operating mode of the infotainment system 300 during the transmission 110 of the data. Different operating modes may comprise, for example, a telephone mode, a navigation and map mode, a playback mode for radio broadcasts and audio data or a basic mode which may correspond, for example, to a main menu of the infotainment system 300. Depending on the active operating mode, the control unit 421 can then offer 130 a function which the active operating mode has, with priority or exclusively to the user via the output interface 430 for use.

This priority or exclusive offering 130 of a function which the current operating mode has can be implemented, for example, by a state machine, in the software or firmware comprised by the control unit 421. An interaction status can be assigned to the current operating mode. The interaction status can be implemented, for example, as a variable in the software or firmware. The software or firmware can then query the interaction status to be able to infer the current operating mode via it and offer 130 a function which the current operating mode has, with priority or exclusively during the transmission 110 of data to the infotainment system. If the operating mode is changed by an interaction, for example, by an input of the user on the input device 434, the interaction status changes accordingly. This is explained below on the basis of a number of examples:

If the active operating mode is, for example, the telephone mode, the control unit 421 can recognize this via the interaction status. If a digital business card, for example, which contains an address and a telephone number is then transmitted 110 to the infotainment system 300, the control unit 421 checks 120 these data and can assign both a navigation function and a telephony function to them. As a result of the recognized telephone mode, the apparatus 400 can, however, with priority or exclusively offer 130 a telephone call to a connection assigned to the telephone number to the user for use.

If only a telephone number, for example, in a digital business card or in a URI, is transmitted 110 to the infotainment system 300, these transmitted data can be assigned only to the telephony function during the check 120 by the control unit 421. Regardless of the operating mode, which could be the navigation and map mode or the basic mode as well as the telephone mode, the apparatus 400 can now with priority or exclusively offer 130 a telephone call to a connection assigned to the telephone number to the user for use.

In a further example, the transmitted data are a digital business card or a URI or URL which contains an address only, and the active operating mode is the telephone mode.

The control unit 421 can then establish on the basis of the interaction status that the telephone mode is active and that transmitted data cannot, however, be assigned to a telephony function, but only to a navigation function. Consequently, the apparatus 400 can with priority or exclusively offer a navigation to the address. If the user confirms the offered navigation function, the apparatus 400 or its control unit 421 can change the current operating mode and the interaction status linked to it to the navigation and map mode.

Accordingly, if the navigation and map mode is active during the transmission 110 of data, such as, for example, a digital business card, a URI or a URL which contain, for example, an address and a telephone number or an address only, the apparatus 400 can with priority or exclusively offer 130 a navigation to the address to the user for use.

Conversely, when navigation and map mode is active, if a digital business card or a URI which contains only a telephone number is involved, the apparatus 400 can with priority or exclusively offer a telephone call to a connection assigned to the telephone number. If the user confirms the use of the telephony function, the apparatus 400 or its control unit 421 can change the current operating mode and the interaction status linked to it to telephone mode.

In a next example, the infotainment system 300 is assumed to be in another operating mode, such as the basic mode. A digital business card with an address and telephone number is furthermore transmitted 110. The apparatus 400 can now offer 130 both a navigation to the address and a telephone call to a connection assigned to the telephone number to the user for use. The apparatus 400 can be configured by a default setting in such a way that one of the functions can be with priority or exclusively offered 130.

If the data transmitted in another operating mode contain a telephone number only, the apparatus 400 can with priority or exclusively offer a telephone call to a connection assigned to the telephone number. Conversely, if they contain an address or geographical coordinates only, the apparatus 400 can with priority or exclusively offer 130 a navigation to the address or to a location assigned to the geographical coordinates.

Along with the functions which can be with priority offered, as described in these examples, further functions can be offered 130 by the apparatus 400 to the user for use. These may comprise, in particular, storage of the transmitted data on the SSD 423 and or temporary storage in the RAM 422.

A further example embodiment of an infotainment system for a transportation vehicle comprises a communication interface which is configured to receive data; an analysis device which is configured to check whether the data transmitted to the infotainment system can be assigned to functions of the infotainment system; and an output interface which is configured to offer for use those functions to which the data can be assigned. The communication interface is optionally configured to receive data via a wireless communication link, such as, for example, via NFC on BLUETOOTH®.

A further example embodiment is a transportation vehicle with an infotainment system of this type.

Depending on specific implementation requirements, example embodiments can be implemented in hardware or in software. The implementation can be carried out using a digital storage medium, for example, a floppy disk, a DVD, a Blu-ray disc, a CD, a ROM, a PROM, an EPROM, an EEPROM or a FLASH memory, a hard disk or other magnetic or optical memory on which electronically readable control signals are stored which can interact or interact with a programmable hardware component in such a way that the respective method is carried out.

A programmable hardware component can be formed by a processor, a computer processor (CPU=Central Processing Unit), a graphics processor (GPU=Graphics Processing Unit), a computer, a computer system, an Application-Specific Integrated circuit (ASIC), an integrated circuit (IC), a System on Chip (SOC), a programmable logic element or Field Programmable Gate Array (FPGA) with a microprocessor.

The digital storage medium can therefore be machine-readable or computer-readable. Some example embodiments therefore comprise a data medium which has electronically readable control signals which are capable of interacting with a programmable computer system or a programmable hardware component in such a way that one of the methods described herein is carried out. At least one example embodiment is thus a data medium (or a digital storage medium or computer-readable medium) on which the program to carry out one of the methods described herein is recorded.

Generally speaking, example embodiments can be implemented as a program, firmware, a computer program or computer program product with a program code or as data, wherein the program code or the data is/are instrumental in carrying out one of the methods if the program runs on a processor or on a programmable hardware component. The program code or the data can also be stored, for example, on a machine-readable medium or data medium. The program code or the data can be present, inter alia, as source code, machine code or byte code, and as other intermediate code.

REFERENCE NUMBER LIST

100 Method for selecting a function of an infotainment system of a transportation vehicle
110 Transmit
120 Check
130 Offer for use
200 Transportation vehicle
300 Infotainment system
400 Apparatus for selecting a function of an infotainment system of a transportation vehicle
410 Communication interface
420 Analysis unit
421 Control unit
422 Volatile memory or RAM
423 Non-volatile memory or SSD
430 Output interface
431 Monitoring module
432 Display device
433 Speech generation device
434 Input device
500 Telephone
600 Navigation system
700 Audio system
800 Mobile terminal device

The invention claimed is:

1. A method for selecting a function of an infotainment system of a transportation vehicle, wherein the infotainment system comprises at least two operating modes and each operating mode provides at least one infotainment system function, the method comprising:
transmitting data to the infotainment system;
checking, by the infotainment system, whether the transmitted data is compatible with functions of the infotainment system to identify compatible infotainment functions, and associating the transmitted data with the compatible infotainment functions, wherein the checking is executed by an analysis device implemented in software and/or hardware included in a central processing unit, application-specific integrated circuits, and/or field-programmable gate arrays, and wherein the analysis device analyzes a data format or file format of the transmitted data and assigns the transmitted data to identified compatible infotainment functions based on the analyzed format; and offering, for selection by a user, the compatible infotainment functions that have the transmitted data associated therewith based on the analyzed format in response to the association of the transmitted data with the compatible infotainment functions, wherein the offering is executed by an output interface implemented as (i) a display device configured to display visual representation forms and/or (ii) a speech and/or sound generation device that enables user interaction with the output interface to select one of the associated compatible infotainment functions after offering of the compatible infotainment functions, and wherein the offering includes priority offering, by the output interface, at least one of (i) the compatible infotainment functions of a currently active operating mode of the at least two operating modes during the transmission of the data and (ii) the compatible infotainment functions of a predefined operating mode of the at least two operating modes.

2. The method of claim 1, wherein information extracted from the transmitted data is linked as parameters to the compatible infotainment functions to be offered during the offering of the compatible infotainment functions for selection.

3. The method of claim 1, wherein the compatible infotainment functions that are priority offered for selection are marked and/or are announced first and at least one remaining compatible infotainment function of the compatible infotainment functions which is to be offered for selection are unmarked and/or are announced after the compatible infotainment functions that are priority offered.

4. The method of claim 1, wherein the offering of the compatible infotainment functions for selection comprises a display of texts assigned to the compatible infotainment functions and/or visual representations assigned to the compatible infotainment functions on the display device.

5. The method of claim 1, wherein the offering of the compatible infotainment functions for selection comprises an output of speech assigned to the compatible infotainment functions via the speech generation device.

6. The method of claim 1, wherein the compatible infotainment functions to be offered for selection comprise a navigation to an address or a telephone call to a connection assigned to the telephone number when the transmitted data comprise contact data, and wherein the checking whether the transmitted data is compatible with functions of the infotainment system includes checking whether the transmitted data is compatible with a navigation function of the infotainment system for the navigation to the address or a telephone function of the infotainment system for the call to the connection assigned to the telephone number before offering the compatible function to the user.

7. The method of claim 1 further comprising:
performing the offered compatible infotainment functions.

8. An infotainment system for a transportation vehicle, comprising:

a communication interface to receive data;

an analysis device implemented in software and/or hardware included in a central processing unit, application-specific integrated circuits, and/or field-programmable gate arrays configured to check whether the data transmitted to the infotainment system is compatible with functions of the infotainment system to identify compatible infotainment functions, configured to analyze a data format or file format of the transmitted data, and configured to assign the transmitted data to identified compatible infotainment functions based on the analyzed format; and an output interface implemented as (i) a display device configured to display visual representation forms and/or (ii) a speech and/or sound generation device configured to offer, for selection by a user, the compatible infotainment functions that have the transmitted data associated therewith based on the analyzed format in response to the association of the transmitted data with the compatible infotainment functions, and configured to enable user interaction with the output interface to select one of the associated compatible infotainment functions after offering of the compatible infotainment functions.

9. The system of claim 8, wherein information extracted from the transmitted data is linked as parameters to the compatible infotainment functions to be offered during the offering of the compatible infotainment functions for selection.

10. The system of claim 8, wherein the offering of the compatible infotainment functions for selection comprises a display of texts assigned to the compatible infotainment functions and/or visual representations assigned to the compatible infotainment functions on the display device.

11. The system of claim 8, wherein the offering of the compatible infotainment functions for selection comprises an output of speech assigned to the compatible infotainment functions via the speech generation device.

12. The system of claim 8, wherein the compatible infotainment functions to be offered for selection comprise a navigation to an address or a telephone call to a connection assigned to the telephone number when the transmitted data comprise contact data, and wherein the checking whether the transmitted data is compatible with functions of the infotainment system includes checking whether the transmitted data is compatible with a navigation function of the infotainment system for the navigation to the address or a telephone function of the infotainment system for the call to the connection assigned to the telephone number before offering the compatible function to the user.

13. The system of claim 8, wherein the offered compatible infotainment functions are performed.

14. A method for selecting a function of an infotainment system of a transportation vehicle, wherein the infotainment system comprises at least two operating modes and each operating mode provides at least one infotainment system function, the method comprising:

transmitting data to the infotainment system;

checking, by the infotainment system, whether the transmitted data is compatible with functions of the infotainment system to identify compatible infotainment functions, and associating the transmitted data with the compatible infotainment functions, wherein the checking is executed by an analysis device implemented in software and/or hardware included in a central processing unit, application-specific integrated circuits, and/or field-programmable gate arrays and wherein the analysis device analyzes a data format or file format of the transmitted data and assigns the transmitted data to identified compatible infotainment functions based on the analyzed format; and offering, for selection by a user, the compatible infotainment functions that have the transmitted data associated therewith based on the analyzed format in response to the association of the transmitted data being associated with the compatible infotainment functions, wherein the offering is executed by an output interface implemented as (i) a display device configured to display visual representation forms and/or (ii) a speech and/or sound generation device that enables user interaction with the output interface to select one of the associated compatible infotainment functions after offering of the compatible infotainment functions, and wherein the offering includes exclusively offering, by the output interface, at least one of (i) the compatible infotainment functions of a currently active operating mode of the at least two operating modes during the transmission of the data and (ii) the compatible infotainment functions of a predefined operating mode of the at least two operating modes.

15. The method of claim 14, wherein information extracted from the transmitted data is linked as parameters to the compatible infotainment functions to be offered during the offering of the compatible infotainment functions for selection.

16. The method of claim 14, wherein the offering of the compatible infotainment functions for selection comprises a display of texts assigned to the compatible infotainment functions and/or visual representations assigned to the compatible infotainment functions on the display device.

17. The method of claim 14, wherein the offering of the compatible infotainment functions for selection comprises an output of speech assigned to the compatible infotainment functions via the speech generation device.

18. The method of claim 14, wherein the compatible infotainment functions to be offered for selection comprise a navigation to an address or a telephone call to a connection assigned to the telephone number when the transmitted data comprise contact data, and wherein the checking whether the transmitted data is compatible with functions of the infotainment system includes checking whether the transmitted data is compatible with a navigation function of the infotainment system for the navigation to the address or a telephone function of the infotainment system for the call to the connection assigned to the telephone number before offering the compatible function to the user.

19. The method of claim 14, the method further comprising:

performing the offered functions.

* * * * *